United States Patent
Kataoka et al.

[11] Patent Number: 5,995,104
[45] Date of Patent: Nov. 30, 1999

[54] VEHICLE DISPLAY UNIT WITH THREE-DIMENSIONAL MENU CONTROLLED BY AN INPUT DEVICE WHICH HAS TWO JOYSTICKS

[75] Inventors: Ichiro Kataoka; Masao Suzuki; Masayuki Ogawa, all of Shizuoka, Japan

[73] Assignee: Yazaki Corporation, Tokyo, Japan

[21] Appl. No.: 08/683,106

[22] Filed: Jul. 16, 1996

[30] Foreign Application Priority Data

Jul. 21, 1995 [JP] Japan ................................. 7-185835

[51] Int. Cl.⁶ ........................... G06F 3/00; G09G 5/08
[52] U.S. Cl. ................................. 345/355; 345/145
[58] Field of Search ........................ 345/145, 146, 345/157, 160, 161, 163, 352, 353, 354, 355, 356, 357; 364/188, 190; 340/995

[56] References Cited

U.S. PATENT DOCUMENTS

| | | | |
|---|---|---|---|
| 4,217,569 | 8/1980 | Nejedly et al. | 338/2 |
| 4,758,692 | 7/1988 | Roeser et al. | 200/6 A |
| 4,987,527 | 1/1991 | Hamada et al. | 345/157 |
| 5,095,302 | 3/1992 | McLean et al. | 345/164 |
| 5,264,836 | 11/1993 | Rubin | 345/157 |
| 5,270,689 | 12/1993 | Hermann | 345/145 |
| 5,303,388 | 4/1994 | Kreitman et al. | 345/355 |
| 5,485,197 | 1/1996 | Hoarty | 345/349 |
| 5,539,429 | 7/1996 | Yano et al. | 345/173 |
| 5,555,354 | 9/1996 | Strasnick et al. | 345/349 |
| 5,724,492 | 3/1998 | Matthews, III et al. | 345/419 |
| 5,805,256 | 9/1998 | Miller | 348/734 |

FOREIGN PATENT DOCUMENTS

| | | | |
|---|---|---|---|
| 2-54616 | 4/1990 | Japan | B60H 1/00 |
| 5-193396 | 8/1993 | Japan | B60K 35/00 |
| 6-164973 | 6/1994 | Japan | H04N 5/00 |

*Primary Examiner*—Jeffery Brier
*Assistant Examiner*—Paul A. Bell
*Attorney, Agent, or Firm*—Sughrue, Mion, Zinn, Macpeak & Seas, PLLC

[57] ABSTRACT

A video monitor displaying a plurality of menu screens three-dimensionally is provided. Each of the screens corresponds to a particular mode/amenity of the vehicle. Each of the screens is displayed as a collection of switches corresponding to various functions of the corresponding amenity. An input device is provided to enable the driver to select a screen, i.e., an amenity, and then select a particular switch. In the preferred embodiment the input device is formed as two joysticks commonly structured on a single lever, so that selection of a particular screen and a particular switch within that screen can be done in a single operation.

9 Claims, 11 Drawing Sheets

FIG. 11 (a)   FIG. 11 (b)   FIG. 11 (c)
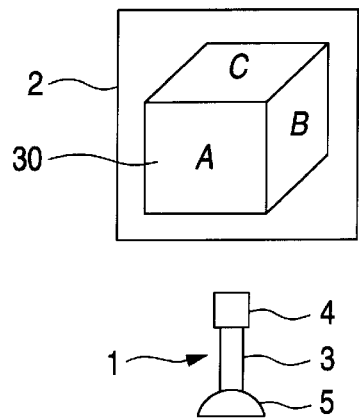 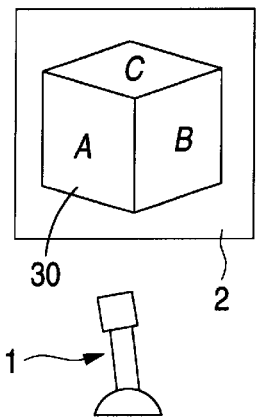 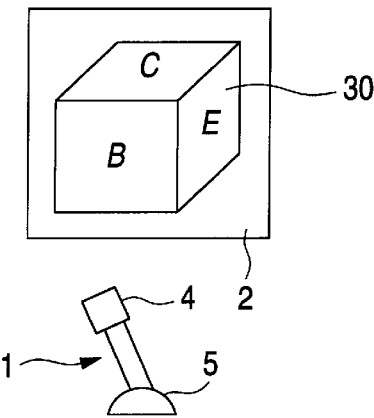
FIG. 12
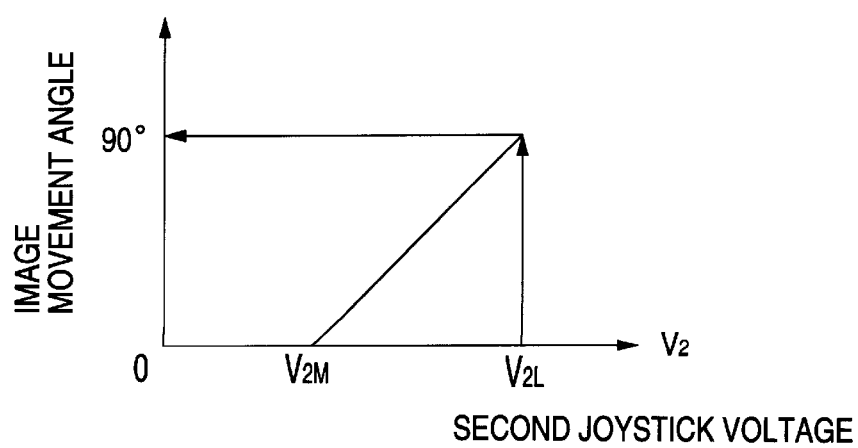

VEHICLE DISPLAY UNIT WITH THREE-DIMENSIONAL MENU CONTROLLED BY AN INPUT DEVICE WHICH HAS TWO JOYSTICKS

BACKGROUND OF THE INVENTION

1. Technical Field of the Invention

The present invention relates to a display unit for a vehicle and an input device therefor. More particularly, the present invention relates to a display unit for a vehicle suitable for use, for example, in a car navigation system, and which allows global control of various functions of the vehicle's amenities using a single input device.

2. Description of Related Art

A car navigation system has been proposed in which various switches are graphically displayed on a monitor screen so that the driver can select switches by moving a cursor on the screen using a joystick. Such a vehicle display unit is demonstrated by the technique shown in FIGS. 16 through 18, which is disclosed in JP-U-2-54616. A description of this technique is provided below with reference to FIGS. 16–18, to facilitate a better understanding of the present invention.

As shown in FIG. 16, a switch selection screen 43 is displayed on a display monitor 42 attached in a position suitable for the driver's viewing. A "cross-hair" cursor 46 is controlled by means of a mouse 44 (FIG. 17), or the like, which is provided on the floor console. The operation of this system can be explained using a specific example, in this case: changing the temperature setting of the automatic climate control.

For example, when the driver wishes to change the temperature setting of the climate control, the driver must first select the "air-conditioning" menu from the initial screen (FIG. 18A) on which various switches 45 for "air-conditioning", "radio", "navigation", etc., are displayed. Then, from the "air-conditioning" menu display the driver selects "temperature" (FIG. 18B). Finally, on the next screen the driver can reset the value of the temperature (FIG. 18C). As can be readily seen, in this particular example the driver has to go through three operations, i.e., three "mouse-clicking".

In the aforementioned vehicle display unit, the video device performs single-plane display so that screens are displayed in a hierarchical structure. Accordingly, the driver must carry out several operations in order to select a desired switch. Specifically, the driver first needs to manipulate the cursor to select the required mode from the mode selection screen. Then the driver needs to select the desired function from the mode screen. Finally, the driver has to select the desired setting from the function screen.

In this manner, substantial time is required for selection because it is necessary for the driver to repeatedly move the cursor and click the mouse to arrive at the desired mode, function and setting screens. Furthermore, in the case where the mode selection screen is to be changed, the driver cannot see the arrangement of the switches on the next screen before the next screen having the arrangement of switches is actually displayed. That is, for example, in any particular instant the driver may wish to change the temperature setting, but a different mode screen, such as a "radio" screen or the like, may be displayed because of a previous operation or of the driver's mistaken operation. Under such condition, the driver cannot arrive at the temperature setting screen until the driver exits the displayed mode and changes to the "air-conditioning" mode.

SUMMARY OF THE INVENTION

The present invention is based on the aforementioned points of view. Accordingly, it is an object of the present invention to provide a vehicle display unit in which a three-dimensional display is provided on a video monitor, and the movement of images and selection of switches on the monitor are carried out by an input device having excellent operation control property. Consequently, image movement and switch selection can be carried out by a single operating process in accordance with the driver's will as if those switches were separately provided on the dashboard.

To solve the aforementioned problems, according to the present invention, a display unit for a vehicle includes a video device having a display portion for three-dimensionally displaying a switch menu so that the displayed images can be rearranged. An input device in the form of an operating lever includes a first switching section for selecting the desired switch from the switch selection screen. A second switching section of the input device is used for moving and rearranging the images on the monitor to thereby display the images of the desired switch selection screen.

According to a preferred embodiment of the present invention, the first switching section is a joystick provided on an upper portion of the operation lever, and the second switching section is a second joystick formed at the base of the operation lever. Alternatively, the first switching section can be formed by a touch display provided on top of the lever. Thus, the lever itself is manipulated in order to rearrange the displayed images, i.e., select the desired mode, and the top joystick or touch display is used to move the cursor on the monitor to select the desired switch and the proper setting.

It should be appreciated that because three-dimensional display is provided according to the present invention, the position of the desired switch can be known at a glance. That is, the menu of each mode is displayed three-dimensionally so the driver can tell which mode to select for a particular switch. As a result, mistaken mode selection can be avoided. Further, since the first joystick for the switch selection is provided on top of the operation lever, the continuous operation of selecting the appropriate mode and then selecting the desired switch can be carried out easily by only one operation.

BRIEF DESCRIPTION OF THE DRAWINGS

FIGS. 11a to 11c are views for explaining the operation of the display unit according to the present invention. FIG. 11a shows an initial state, FIG. 11b shows an intermediate state, and FIG. 11c shows a final state.

FIG. 12 is a graph showing the relationship between the change of the voltage in the second joystick and the image movement.

FIG. 18a shows an initial state, FIG. 18b shows an intermediate state, and FIG. 18c shows a final state.

DETAILED DESCRIPTION OF THE PREFERRED EMBODIMENTS

Preferred embodiments of the present invention will be described below with reference to the drawings.

Figure 1:
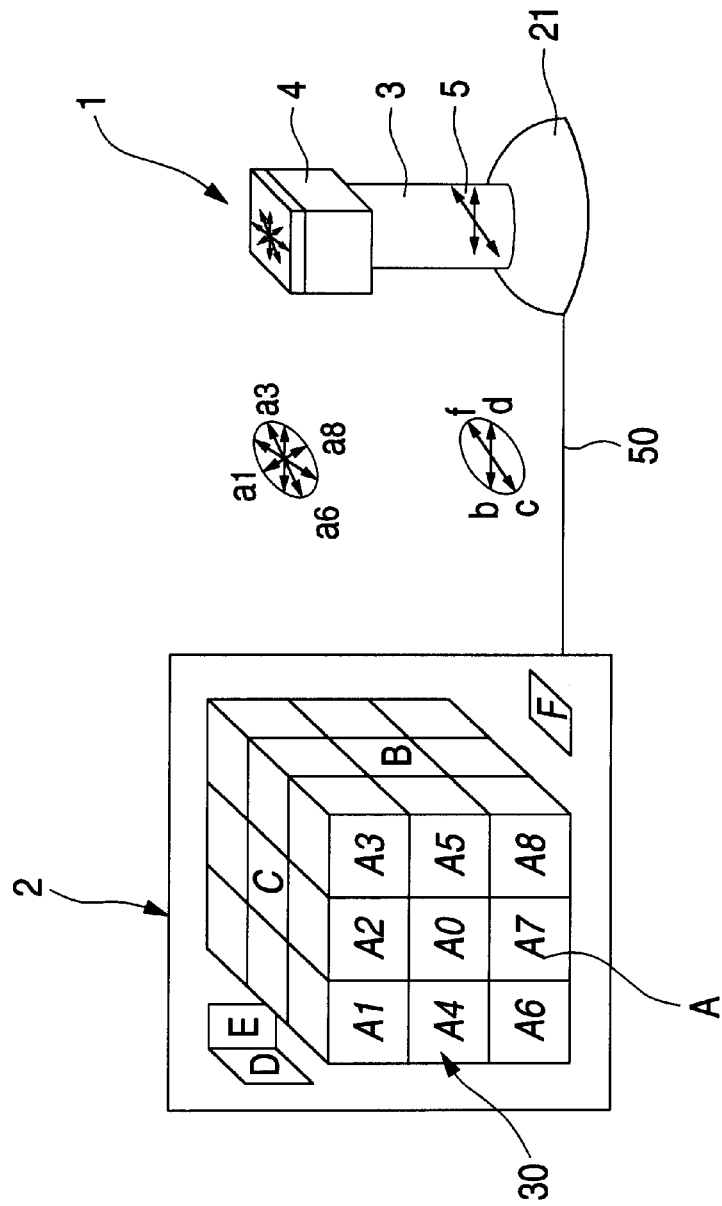
FIG. 1 is a perspective schematic view showing an embodiment of a display unit for a vehicle according to the present invention.

FIG. 1 shows the general structure of the display unit connected to the input device. In the figure, only the video monitor 2 is schematically shown connected to the input lever 1 via wire 50. The monitor 2 can be a CRT, a head-up display (HUD), a horizontal display, etc.

Figure 2:
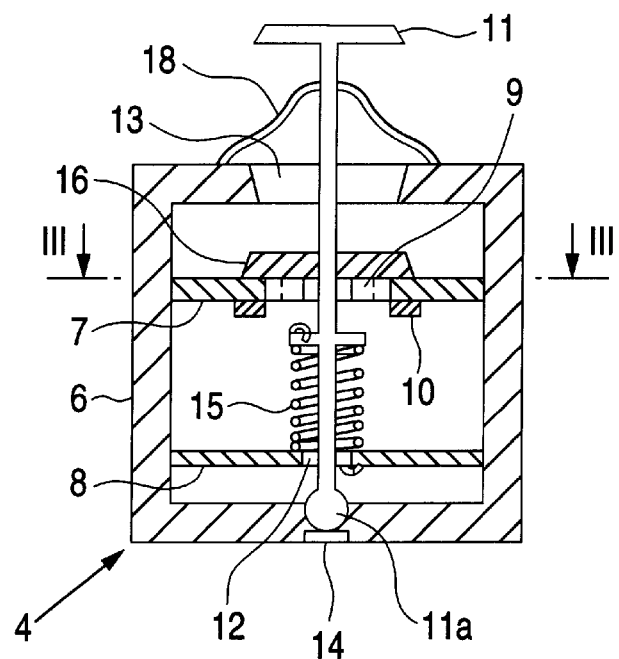
FIG. 2 is a vertical sectional side view showing an embodiment of the first joystick.
Figure 3:
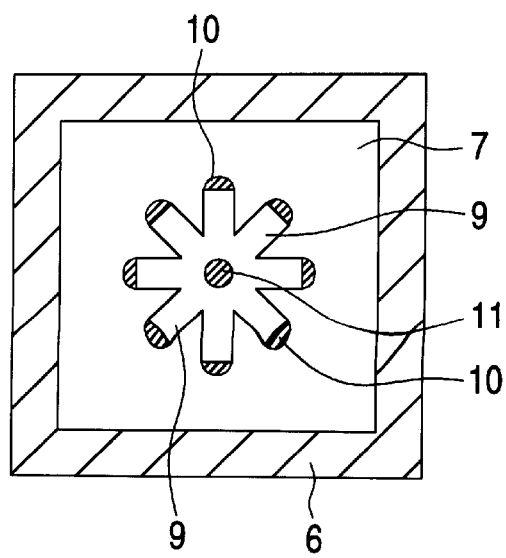
FIG. 3 is a sectional view taken along the line III—III in FIG. 2.

The input device 1 will be described first. As shown in FIG. 1, the input device 1 is constituted by a first joystick 4 mounted on an upper portion of an operation lever 3, and a second joystick 5 provided in a lower portion of the operation lever 3. An embodiment of the first joystick 4 is shown in FIGS. 2 and 3. A guide plate 7 and a spring bearing 8 are attached to an upper portion and to a lower portion, respectively, of housing 6. The guide plate 7 is provided with guide grooves 9 which extend radially to eight directions (a1 to a8 in FIG. 1) respectively. Switches 10 are provided in the base end portions of the guide grooves 9 respectively. An operation stick 11 passes through the guide grooves 9 and a hole 12 of the spring bearing 8 and projects up out of an operation hole 13 which is formed in a top portion of the housing 6. A bulb portion 11a is formed at the lower end of the operation stick 11 so as to be in contact with a push switch 14 attached to the bottom of the housing 6. A tensile spring 15 laid between the spring bearing 8 and an intermediate portion of the operation stick 11 urges the operation stick 11 to move downwards. A rubber bushing 16 is mounted on the guide plate 7 so as to cooperate with the tensile spring 15 to keep the operation stick 11 in a neutral position in which the operation stick 11 is in an up-right position.

In FIG. 2, the reference numeral 18 designates a flexible cover for preventing foreign matter such as dust, or the like, from entering into the housing 6 through the operation hole 13.

When the operation stick 11 is inclined to a desired direction from the neutral position of FIG. 2, the operation stick 11 is pivoted along one of the guide grooves 9 with the bulb portion 11a as a fulcrum, to thereby turn on corresponding one of the switches 10. When the operation stick 11 is pushed downwards, the bulb portion 11a presses the push switch 14 to thereby turn on the push switch 14. The tensile spring 15 is pulled when the operation stick 11 is inclined, so that the spring force of the tensile spring 15 acts on the operation stick 11 to restore the operation stick 11 to the neutral position. The rubber bushing 16 expands or contracts when the operation stick 11 is pivoted so that restoration force created by the rubber bushing 16 keeps the operation stick 11 in the neutral position stably.

Figure 4:
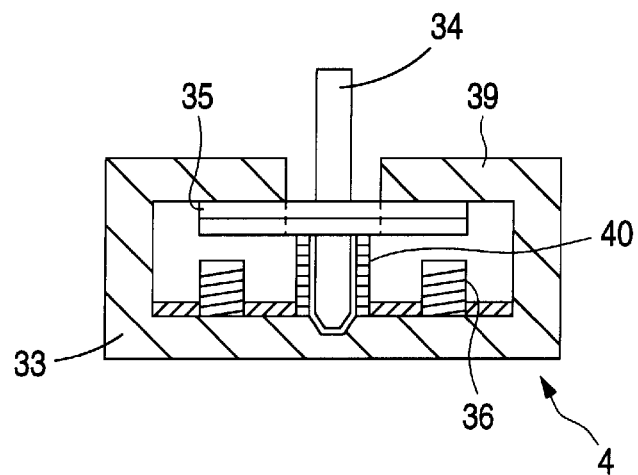
FIG. 4 is a vertical sectional side view showing another embodiment of the first joystick.
Figure 5:
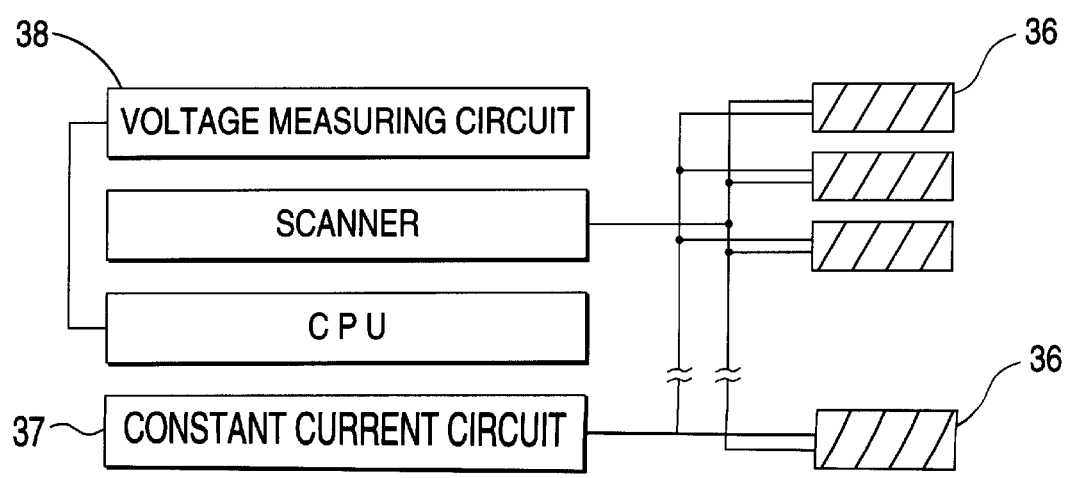
FIG. 5 is a block diagram showing the circuit structure of the first joystick of FIG. 4.
Figure 6:
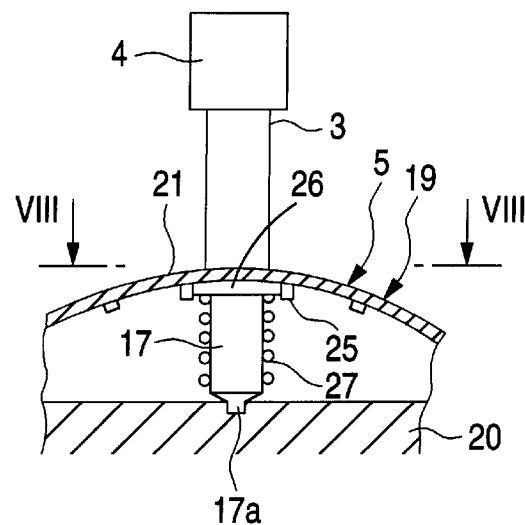
FIG. 6 is a vertical sectional side view of a second joystick.
Figure 7:
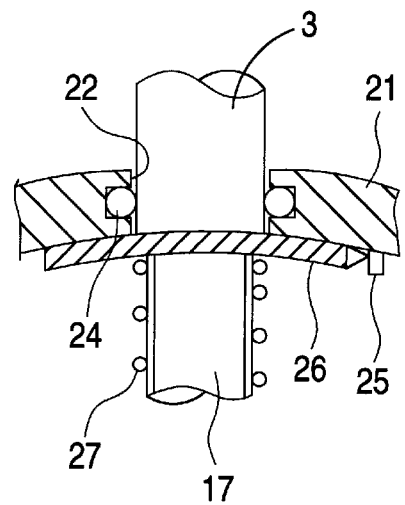
FIG. 7 is a sectional view of the main part of FIG. 6.
Figure 8:
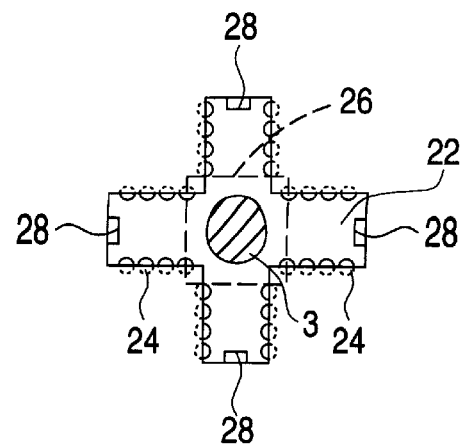
FIG. 8 is a sectional view taken along the line VIII—VIII in FIG. 6.

FIGS. 4 and 5 show another embodiment of the first joystick 4. In FIGS. 4 and 5, the first joystick 4 has an operation stick 34 pivotally supported by a housing 33 and having a switch element 35 constituted by a disk magnet mounted thereon. A plurality of solenoid coils 36 are arranged on a circle concentrically with the operation stick 34 so as to be opposite to the switch element 35. A constant-current circuit 37 and a voltage measuring circuit 38 for detecting approach of the switch element 35 to the solenoid coils 36 are also provided. Further, the reference numeral 40 designates a rubber bushing.

In an initial state (neutral state of the operation stick 34), the solenoid coils 36 are supplied with a current by the constant-current circuit 37 so that the magnetic polarity of the solenoid coils 36 is opposite that of the magnetic polarity of the switch element 35. When the operation stick 34 in this state is inclined to a desired direction, the switch element 35 approaches one of the solenoid coils 36 which is located in that direction. The switch element 35 is attracted gradually by that particular solenoid coil 36 so that the switch element 35 comes into contact with that solenoid coil 36.

The approach of the switch element 35 to the solenoid coil 36 is measured by the voltage measuring circuit 38. After the switch element 35 comes into contact with the solenoid coil 36, current conduction to the solenoid coils 36 is inverted so that the switch element 35 is restored to its initial state by magnetic repulsion force. That is, when the current is inverted, the polarities of the solenoid coil 36 and the switch element 35 are the same, so that the switch element 35 is repelled towards upper surface 39 of the housing 33.

When the user inclines the operation stick 34 to a certain direction, in the first joystick 4 in this embodiment, the switch element 35 is attracted by the corresponding solenoid coil 36 in that direction and, finally, the switch element 35 comes into contact with the solenoid coil 36. Accordingly, the user feels as if the operation stick 34 were operated along one of the guide grooves, so that the user can feel the direction along which the switch is operated.

An embodiment of the second joystick 5 is shown in FIGS. 6 to 9. A shaft supporting portion 17 provided in the lower portion of the operation lever 3 is pivotally supported by a base 20 of a housing 19 through a projection 17a. A spherical cover 21 is provided on the upper portion of the housing 19. Four guide grooves 22, together forming a cross-like opening are formed in the center of the spherical cover 21 so as to extend in four directions (b, c, d and f in FIG. 1) respectively.

Ball bearings 24 are provided in the inside of the guide grooves 22. The operation lever 3 is designed to be pivoted in the four directions along the guide grooves 22. Slide resistors 25 are provided along the guide grooves 22 (see FIGS. 7 and 9) so that the resistance values of the slide resistors 25 are changed when a slide piece 26 mounted on the operation lever 3 moves on the slide resistors 25. Further, a compression spring 27 is provided between the slide piece 26 and the substrate 20 so that the slide piece 26 comes into forced constant contact with the spherical cover 21. Further, limit switches 28 are provided in end portions of the guide grooves 22 respectively.

In the second joystick 5 configured as described above, when the operation lever 3 is pivoted along one of the guide grooves 22, the slide piece 26 is slid along corresponding one of the slide resistors 25. As a result, the resistance value of the corresponding slide resistor 25 is changed and, finally, the slide piece 26 comes into contact with the corresponding limit switch 28 to thereby turn on the switch 28. The operation lever 3 is restored to its neutral position by the compression spring 27.

Next, the video device 2 will be described.

As shown in FIG. 1, a three-dimensional mode menu 30 is displayed on the video monitor 2. The mode menu 30 is shaped like a cube or a die (see FIG. 1). The mode menu 30 is designed so that screens A to F, each having respective switches displayed thereupon, are three-dimensionally displayed as the six planes comprising the mode menu 30. Each of the screens A–F is dedicated to a specific mode. In addition, each of the screens A–F has nine switches (e.g., A0–A8 for screen A), each dedicated to a specific function. The following example will help clarify the function of the screens A–F.

In FIG. 1, screen A is shown to have nine switches A0–A8 displayed thereupon. These displayed switches can be selected by the first joystick 4. When, for example, screen A designates air-conditioning mode, each of the switches A0–A8 corresponds to a respective function, such as temperature, air direction, air quantity, etc. Each of the other screens B–F corresponds to another mode, such as radio, navigation, etc., and the switches depicted in these screens correspond to the appropriate functions, for example, volume, tone, etc., for the radio, and track, skip etc., for the CD player.

The switches displayed on the other screens are not, however, directly selectable by the first joystick 4. As will be described later, in order to select a switch from any of the other screens, the images of the particular screen needs to be moved to the position of screen A by using the second joystick 5.

Since in the three-dimensional display, two sides and the bottom of the cube are obscure, a representation of these screens is provided separately, as shown in FIG. 1. In the preferred embodiment, the area of the monitor 30 is maximized for displaying the cube 30. Thus, the screens D–F are shown smaller and, while each of the screens D–F has nine switches as any of the other switches, when these screens are not moved to the "screen A" position, their respective switches are not shown. Instead, a pictorial or alphanumerical representation of the mode of each screen D–F is provided. To carry out a switching operation, the images of the particular desired screens D, E or F needs be moved to the screen A position. In the preferred embodiment, whenever any of the screens D–F is moved to any of the positions of screens A–C the nine switches of that particular screen D–F is displayed.

Figure 9:
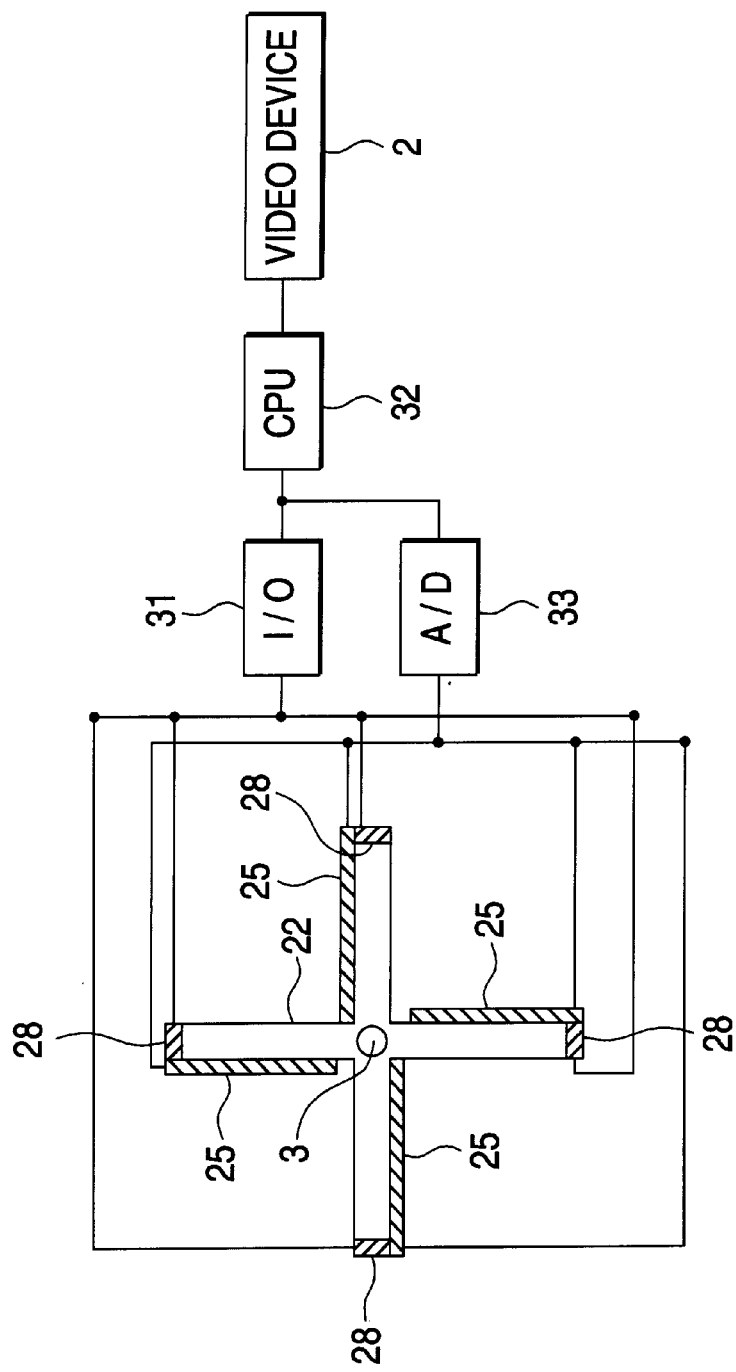
FIG. 9 is a block diagram showing the circuit structure of the second joystick.
Figure 10:
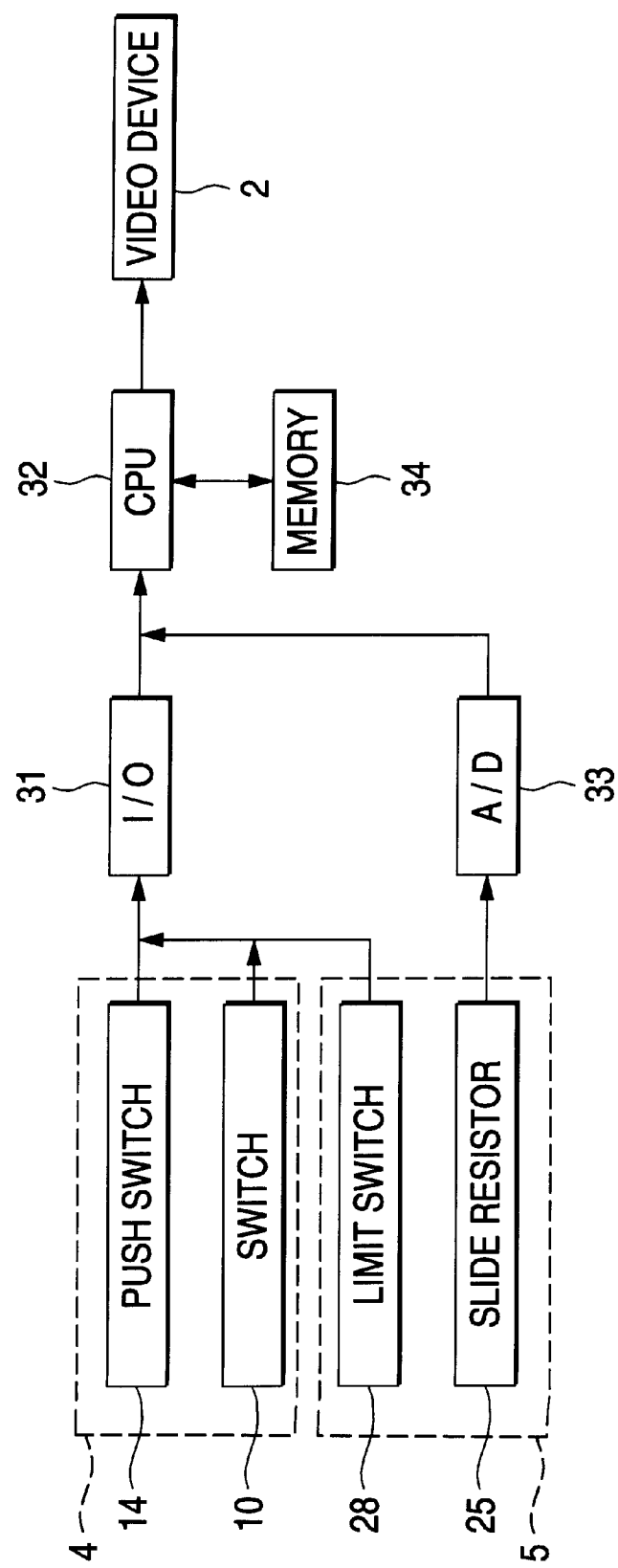
FIG. 10 is a block diagram showing an embodiment of the circuit structure used in the display unit according to the present invention.

In FIGS. 9 and 10, outputs from the push switch 14 and the switches 10 in the first joystick 4 and outputs from the limit switches 28 in the second joystick 5 are input to a central processing unit (CPU) 32 through an input/output device (I/O) 31. Outputs from the slide resistors 25 in the second joystick 5 are converted into digital signals by an analog-to-digital converter (A/D) 33 and the digital signals are input to the CPU 32. The contents of the first joystick 4 and the contents of the second joystick 5 are stored in a memory 34. The video device 2 operates on the basis of the output of the CPU 32.

The operation of the display unit of the preferred embodiment is as follows. In an initial state, the center switch A0 in the screen A of the monitor 30 is distinguished from the other switches A1 to A8 by a different background color which functions as a cursor. When the operation stick 11 of the first joystick 4 is inclined to a given direction, the cursor is moved to that direction. When, for example, the operation stick 11 is moved left obliquely (in the direction of A1 in FIG. 1), the cursor is moved to A1, i.e., the background color of switch A1 changes. When the operation stick 11 in this position is pushed down to thereby turn on the push switch 14, the content of A1 can be executed.

To select the screen B, the operation lever 3 of the input device 1 is pushed to the left (FIG. 11B) from the upright state (FIG. 11A). The resistance value of the slide resistor 25 is thereby changed so that the value V2 of the output voltage in the second joystick 5 is changed correspondingly from V2M to V2L as shown in FIG. 12. After this output is A/D converted by the A/D converter 33, the digital signal thus obtained is input to the CPU 32.

In response, the CPU 32 moves the image of the screen B to the left in correspondence with the resistance value (in practice, voltage value V2) of the slide resistor 25. When the limit switch 28 is turned on, the image movement in the monitor 30 is stopped, so that the screen B is displayed at the position of the screen A (FIG. 11C) and the cursor is moved to the center switch B0 (that is, the prior A0 position). In addition, according to the preferred embodiment, in this state the cursor at the B0 position blinks. Then, in order to select switch B1, for example, the cursor is moved to switch B1 through the operation stick 11 of the first joystick 4 and the push switch 14 is turned on.

Similarly, the screen C can be moved to the position of the screen A when the operation lever 3 is inclined to the direction of c in FIG. 1. Similarly, the screens D and F can be moved to the position of the screen A when the operation lever 3 is inclined to the directions of d and f, respectively, in FIG. 1.

Figure 13:
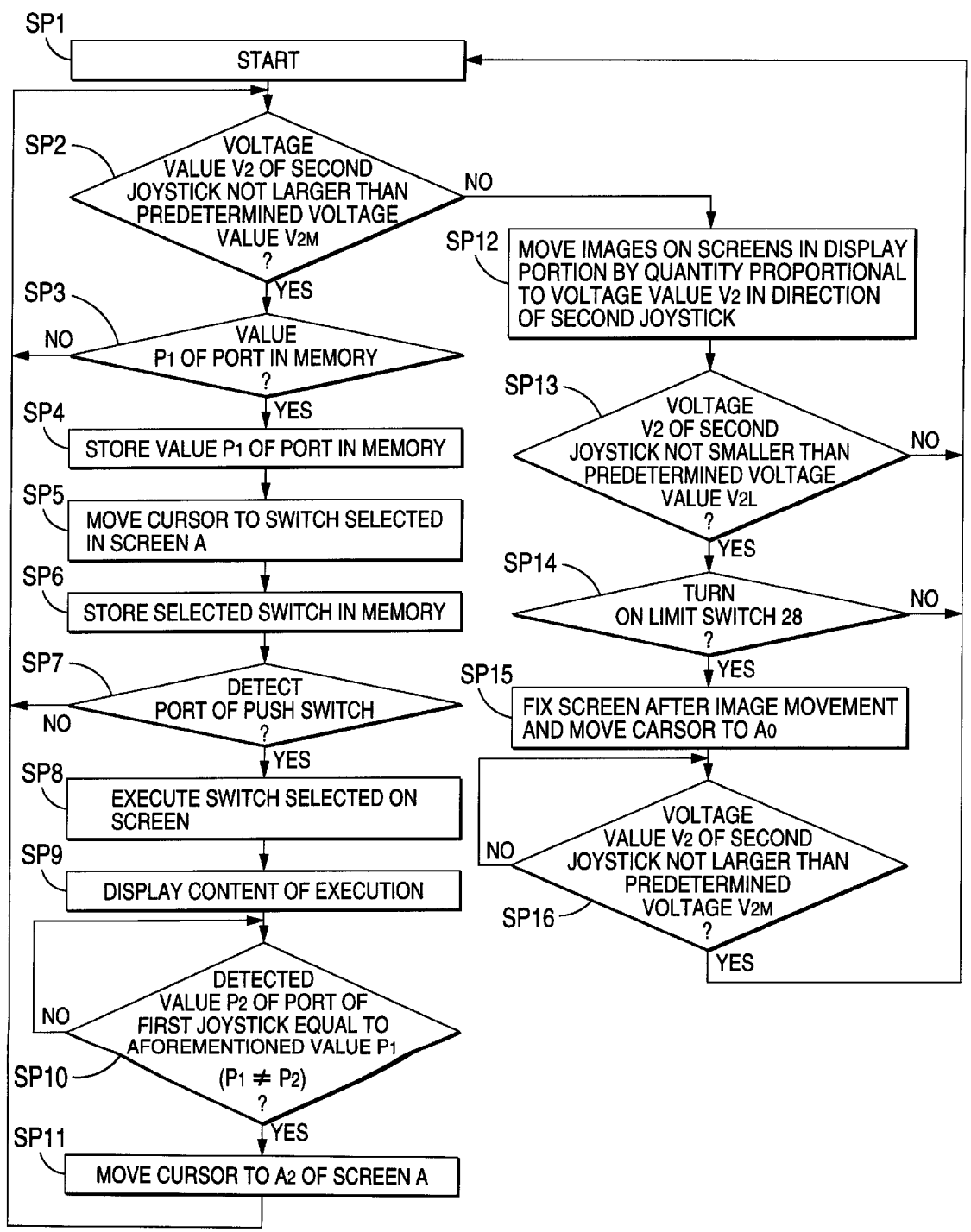
FIG. 13 is a flow chart showing the operation of the display unit according to the present invention.

FIG. 13 is a flow chart for explaining the aforementioned switch selection operation. In the condition in which the voltage value V2 in the second joystick 5 is not larger than the minimum voltage value V2M, that is, in the condition in which the operation lever 3 is not inclined, the routine flows from step SP2 to step SP3. In the step SP3, the port of the first joystick 4 is sensed. If it is determined that a particular switch 10 is turned on, in step SP4 the value P1 sensed from that port is stored in the memory 34. In step SP5, the cursor is moved to the switch A0–A8 corresponding to the particular switch 10.

In step SP6, the selected switch content is stored in the memory 34. Then, the routine flows to step SP7. In the condition in which the port of the push switch 14 is detected to be on in step SP7, the function corresponding to the display switch selected on the screen A is executed in step SP8. In step SP9, the content of the execution is displayed on the screen A to inform the driver of that fact. Next, another switch (for example, A2) is selected on the screen A through the first joystick 4. In step SP10, the detected value P2 of this port is compared with the aforementioned value P1. In the condition of P1≠P2, the routine flows to step SP11 in which A2 is displayed on the screen A and the cursor is moved to A2.

When the voltage value V2 in the second joystick 5 is larger than the minimum voltage value V2M in the step SP2, that is, when the operation lever 3 of the second joystick 5 is inclined, the mode menu 30 is rotated by a quantity proportional to the voltage value V2 in the direction of inclination of the operation lever 3 in step SP12. When the voltage value V2 is not smaller than the maximum voltage value V2L in step SP13, the limit switch 28 is turned on in step SP14. In step SP15, the rotation of the mode menu 30 is stopped and the cursor is moved to the A0 position and is caused to blink. In the condition in which the voltage value V2 reaches the minimum voltage value V2M in step SP16, that is, in the condition in which the second joystick 5 is restored to the neutral position, the routine flows back to the start. Thus, steps SP12–SP16 can place any of the screens B–F in the forward, screen A, position.

Figure 14:
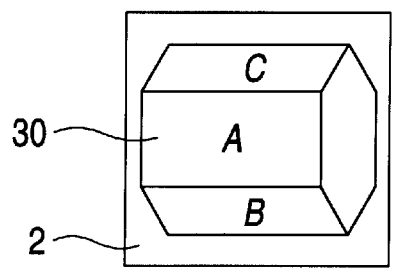
FIG. 14 is a front view of display in another embodiment of the video device according to the present invention.

FIG. 14 shows another embodiment wherein the mode menu 30 is displayed as menu screens forming a hexagonal column structure in which screens A to F are provided in respective planes. Of course, using this structure a different number of screens can be displayed by using an octagonal or other shaped columns. In this structure, images on respective screens A to F in the monitor 30 rotate only vertically so that it is sufficient that the second joystick 5 move in the direction of forward and backward (c and f in FIG. 1). Alternatively, one may wish to also use the sides of the column for display and use directions b and d to rotate the column to the sides.

Figure 15:
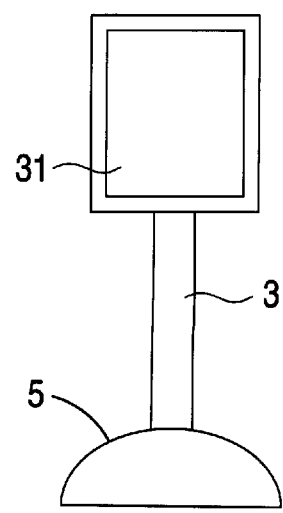
FIG. 15 is a front view showing another embodiment of the input device according to the present invention.
Figure 16:
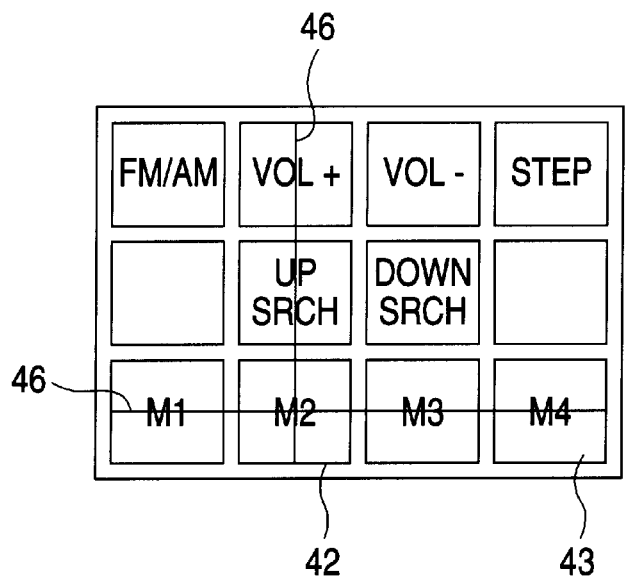
FIG. 16 is a front view of display in a conventional display unit for a vehicle.
Figure 17:
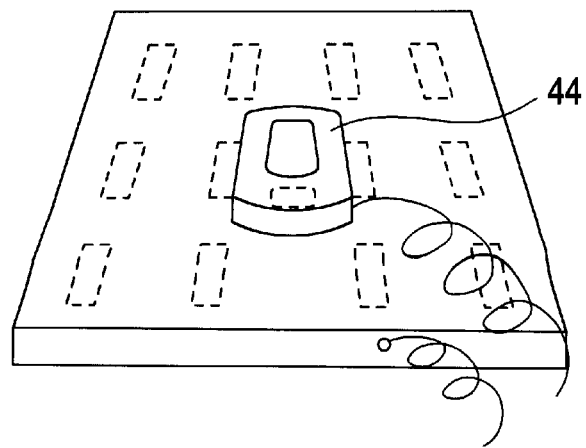
FIG. 17 is a perspective view of an operation portion in the conventional display unit.
Figure 18:
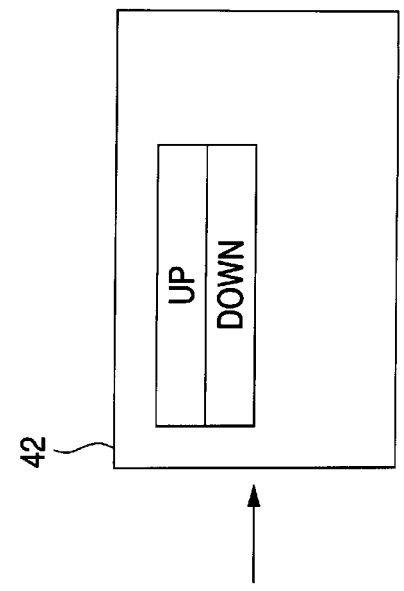
FIGS. 18a to 18c are views for explaining the operation of the conventional display unit for a vehicle.
Figure 18:
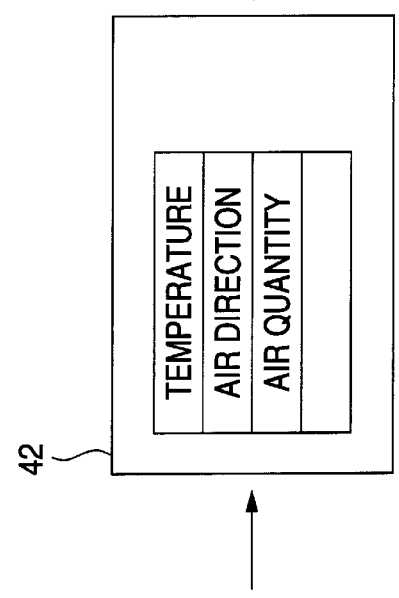
Figure 18:
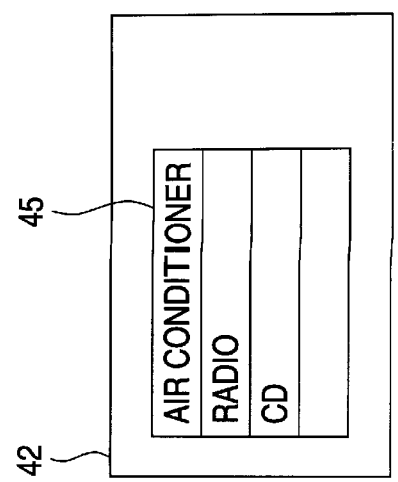

FIG. 15 shows another embodiment of the input device 1 in which a touch display 31 is used instead of the first joystick 4, so that the touch display 31 performs the function of the first joystick 4. The touch display 31 is attached to the upper portion of the operation lever 3 in the second joystick 5. Accordingly, the cursor in the monitor 30 can be moved using the touch display 31, while the screens can be selected using the second joystick 5 through the operation lever 3.

While according to the preferred embodiments two joysticks are used in combination as the input device, it should be recognized that a similar effect can be achieved using only one joystick by, for example, using the same joystick 4 to also perform the image moving function.

As described above in detail, according to the present invention, the following effects arise. That is, according to an aspect of the present invention, three-dimensional display is provided on the monitor, and the rotation and switch selection is performed using the input device. Accordingly, the switches corresponding to several modes are constantly displayed, so that erroneous mode selection can be prevented. Also, switch selection can be done in one operation. Furthermore, the size of the device is small so that the switches can be selected handily. Further, because no hierarchical structure as in the conventional navigation is used, the driver can execute a desired function directly without having to memorize the hierarchial structure needed to select a particular switch.

Using the two joysticks according to the preferred embodiment of the subject invention, the continuous operation of moving images and then executing switch selection can be carried out easily by only one operating process. Further, switch selection can be performed by one touch when utilizing the touch display instead of one of the joysticks.

Although the present invention have been described with reference to preferred embodiments and examples thereof, those skilled in the art would appreciate that various modifications, additions and substitutions are possible without departing from the scope and spirit of the invention as recited in the accompanying claims. For example, while the present invention has been described with reference to vehicles, it would be appreciated that it can be used whenever a display and an input device therefor can be used.

What is claimed is:

1. A video display unit comprising:

a monitor for displaying video images; and a microprocessor preprogrammed to control said monitor to perform the following functions:

display a three-dimensional mode menu having a plurality of screens corresponding to a plurality of modes wherein a designated screen of said plurality of screens is displayed in a frontal position of said three-dimensional mode menu and the remaining screens are displayed in positions other than said frontal position, such that all of said screens can be viewed simultaneously either as screens or as representations of these screens, and wherein each of said screens comprises a graphical representation of plurality of switches and each of said switches corresponds to one of a plurality of functions associated with one of the plurality of modes;

display a cursor, movable in response to commands externally input from an input device to said microprocessor, to designate any of said plurality of switches of the screen which is displayed in the frontal position of said three-dimensional mode menu;

said microprocessor being responsive to signals from the input device to rotate said three-dimensional mode menu so that said designated screen is moved to another position in said three-dimensional mode menu and one of the remaining screens is moved to the frontal position.

2. A combination video display unit and input apparatus thereof, comprising:

a first input device and a second input device commonly forming said input apparatus;

a monitor for displaying video images; and a microprocessor preprogrammed to control said monitor to perform the following functions:

display a three-dimensional mode menu having a plurality of screens corresponding to a plurality of modes wherein a designated screen of said plurality of screens is displayed in a frontal position of said three-dimensional mode menu and the remaining screens are displayed in positions other than said frontal position, such that all of said screens can be viewed simultaneously either as screens or as representations of these screens, and wherein each of said screens comprises a graphical representation of plurality of switches and each of said switches corresponds to one of a plurality of functions associated with one of the plurality of modes;

display a cursor, movable in response to commands externally input from said second input device to said microprocessor, to designate any of said plurality of switches of the screen which is displayed in the frontal position of said three-dimensional mode menu;

said microprocessor being responsive to signals from said first input device to rotate said three-dimensional mode menu so that said designated screen is moved to another position in said three-dimensional mode menu and one of the remaining screens is moved to the frontal position.

3. The combination video display unit and input apparatus thereof of claim 2, wherein said second input device comprises a selection switch for sending a select command to said microprocessor, and wherein said microprocessor is responsive to said select command to execute a routine corresponding to one of said plurality of switches designated by said cursor at the instant said select command was received by said microprocessor.

4. The combination video display unit and input apparatus thereof of claim 3, wherein:

said first input device comprises a first tiltable joystick resiliently maintaining a neutral up-right position;

said second input device comprises a second joystick attached on the top of said first joystick, said second joystick being tiltable independently of said first joystick and resiliently maintaining a neutral up-right position.

5. The combination video display unit and input apparatus thereof of claim 2, wherein:

said first input device comprises a tiltable joystick resiliently maintaining a neutral up-right position; and, said second input device comprises a touch display provided on top of said joystick.

6. A display unit and an input apparatus therefor, comprising:

a video device including a monitor for displaying a plurality of menus three dimensionally on a screen, one of said menus being displayed in a frontal position, where all of said menus can be viewed simultaneously either as menus or as representations of these menus, and each of said menus comprising a graphical display of a plurality of switches, said video device further comprising a microprocessor for controlling said monitor;

a first input means for rotating the display of said plurality of menus, so as to change the menu displayed in the frontal position, by sending signals to said microprocessor;

a second input means for controlling movement of a cursor displayed on said screen, for designating one of said plurality of switches, by sending signals to said microprocessor.

7. The display unit and an input apparatus therefor of claim 6, wherein said second input means comprises a selection switch for sending a select command to said microprocessor, and wherein said microprocessor is responsive to said select command to execute a routine corresponding to one of said plurality of switches designated by said cursor at the instant said select command was received by said microprocessor.

8. The display unit and an input apparatus therefor of claim 7, wherein said first input means comprises said first input device comprises a tiltable joystick resiliently maintaining a neutral up-right position; and said second input device comprises a second joystick attached on the top of said first joystick, said second joystick being tiltable independently of said first joystick and resiliently maintaining a neutral up-right position, said second joystick including said selection switch.

9. The display unit and an input apparatus therefor of claim 7, wherein said first input means comprises a tiltable joystick-resiliently maintaining a neutral up-right position; and said second input means is constituted by a touch display provided on an upper portion of said operation lever and includes said selection switch.

* * * * *